United States Patent
Boehringer et al.

[19]

[11] Patent Number: 6,003,641
[45] Date of Patent: Dec. 21, 1999

[54] WHEEL AND BRAKE ASSEMBLY

[75] Inventors: Wilfred E. Boehringer, Fullerton, Calif.; Michael A. Long, Freeland, Wash.

[73] Assignee: McDonnell Douglas Corporation, Huntington Beach, Calif.

[21] Appl. No.: 08/889,245

[22] Filed: Jul. 8, 1997

Related U.S. Application Data

[63] Continuation of application No. 08/585,791, Jan. 16, 1996, Pat. No. 5,862,890.

[51] Int. Cl.$^6$ .................................................. F16D 55/36
[52] U.S. Cl. ................................. 188/71.5; 188/73.36
[58] Field of Search ................... 188/71.5, 73.35, 188/73.36, 73.37, 218 A, 264 G, 18 A, 73.38

[56] References Cited

U.S. PATENT DOCUMENTS

| | | | |
|---|---|---|---|
| 2,875,855 | 3/1959 | Albright | 188/18 |
| 3,351,157 | 11/1967 | Claveau | 188/18 |
| 3,357,519 | 12/1967 | Anderson et al. | 188/18 |
| 3,368,653 | 2/1968 | Vander Veen | 188/218 |
| 3,845,919 | 11/1974 | Jenny | 244/103 |
| 4,290,505 | 9/1981 | Kramer | 188/18 |
| 4,383,594 | 5/1983 | Correll et al. | 188/71.5 |
| 4,576,255 | 3/1986 | Méry et al. | 188/71.5 |
| 4,805,744 | 2/1989 | Pringle | 188/71.5 |
| 4,944,370 | 7/1990 | Chambers et al. | 188/71.5 |
| 5,035,305 | 7/1991 | Lammers | 188/71.5 |
| 5,062,503 | 11/1991 | Black et al. | 188/71.5 |
| 5,107,968 | 4/1992 | Delpassand | 188/264 |
| 5,143,184 | 9/1992 | Snyder et al. | 188/218 |
| 5,205,382 | 4/1993 | Edminsten | 188/71.5 |
| 5,255,761 | 10/1993 | Zaremsky | 188/71.5 |
| 5,323,881 | 6/1994 | Machan et al. | 188/71.5 |
| 5,402,865 | 4/1995 | Harker | 188/71.5 |
| 5,437,352 | 8/1995 | Harker | 188/71.5 |
| 5,485,898 | 1/1996 | Patko | 188/71.5 |
| 5,494,138 | 2/1996 | Scelsi et al. | 188/18 |
| 5,540,305 | 7/1996 | Hammond et al. | 188/71.5 |
| 5,579,873 | 12/1996 | Kohar et al. | 188/73.35 |
| 5,862,890 | 1/1999 | Long et al. | 188/71.5 |

FOREIGN PATENT DOCUMENTS

| | | |
|---|---|---|
| 2 117 465 | 10/1983 | United Kingdom . |
| PCT/US80/ 00644 | 12/1981 | WIPO . |

*Primary Examiner*—Robert J. Oberleitner
*Assistant Examiner*—Pamela J. Lipka
*Attorney, Agent, or Firm*—Senniger, Powers, Leavitt & Roedel

[57] ABSTRACT

A wheel and brake assembly comprising an axle, a bearing supported on the axle, a wheel rotatably mounted on the axle by the bearing and a torque tube located in a fixed position about the axle. The torque tube includes a torque tube foot extending radially inward from the torque tube to the axle for support by the axle. At least one stator disc is connected with the torque tube and one rotor disc is connected with the wheel for conjoint rotation therewith. An actuator is provided for axially moving the rotor and stator discs into frictional engagement with one another for braking the wheel. A clamp is located at one end of the axle for axially clamping the bearing, torque tube, brake housing and axle. A vibration dampener operatively engages the torque tube and is arranged to attenuate vibrations in the torque tube and inhibit their transmission to the axle.

22 Claims, 5 Drawing Sheets

WHEEL AND BRAKE ASSEMBLY

CROSS-REFERENCE TO RELATED APPLICATION

This application is a continuation-in-part of application Ser. No. 08/585,791 filed Jan. 16, 1996, now U.S. Pat. No. 5,862,890.

BACKGROUND OF THE INVENTION

This invention relates to wheel and brake assemblies and, more particularly, to a wheel and brake assembly which provides vibration dampening between a torque tube and axle of the assembly.

A typical brake assembly, particularly though not exclusively for use in aircraft, includes a wheel rotatably mounted on an axle, a brake stack comprising rotor and stator discs and a brake actuating mechanism for applying pressure to the brake stack to brake the wheel. The rotor discs are connected to the wheel for conjoint rotation with the wheel and the stator discs are connected to a torque tube which is mounted in a rotationally fixed position. The torque tube of a brake assembly, which is pin mounted to the axle for quick change capability, typically includes a foot extending radially inward to the axle for support by the axle.

During braking operations, the torque tube may experience torsional and axial vibratory movement relative to the axle initiated by the braking torque applied to the torque tube by the brake stack. The vibration of the torque tube may be transmitted throughout the brake assembly, creating not only an excessive amount of noise, but also reducing the life of the brake and potentially causing structural fatigue and failure of aircraft landing gear components, thereby impacting aircraft serviceability, reliability, and maintenance costs.

Previously, attempts have been made to suppress brake vibration through hydraulic dampening, structural modifications such as turnbuckles to load the brake against the landing gear, stiffening of brake and landing gear components, or modification of the brake material. These design changes typically result in increased weight of the aircraft, increased manufacturing costs, and a reduction in reliability. Moreover, the structural devices which provide additional loading between the brake and landing gear require tight manufacturing tolerances for proper installation and operation. Structural variations in the landing gear and brake assembly due to wear or vibration will also reduce the effectiveness of these devices over time.

Prior art brake assemblies also include flange mounted brakes having a dampening plate located between a flange of the axle and the torque tube which are clamped to one another. These dampening devices cannot be used on quick-change pin mounted brakes since the torque tube is not clamped directly to the axle. Instead, an indirect load path must be provided between the torque tube and axle to create a clamping force therebetween to isolate the torque tube from the axle and prevent vibration.

SUMMARY OF THE INVENTION

The present invention overcomes the deficiencies of the prior art by providing a quick-change pin mounted brake assembly which increases vibrational dampening by isolating the brake from an axle and loading the brake against the axle upon which the brake is mounted to reduce vibration in the brake assembly during braking action. Among the features of the present invention may be noted a brake assembly having a vibrational dampener which does not impact brake performance since the vibrational dampener does not reduce the braking efficiency. The brake assembly loads the torque tube foot, thus increasing coulomb friction dampening. Impulse forces applied to the landing gear during braking action are minimized by eliminating free play. The brake assembly is easy to install on existing brake and wheel assemblies with little or no modification, thus allowing for a simple retrofit of existing aircraft. Furthermore, the wheel and brake assembly retains the ability to quickly change out the brake assembly and does not impact maintenance times. The brake assembly allows for thermal expansion during braking, which reduces wear on the brakes and structural components. Moreover, the brake assembly is lightweight and reliable.

Generally, a wheel and brake assembly of the present invention includes an axle having a central longitudinal axis, at least one bearing supported on the axle and a wheel mounted on the axle by the bearing for rotation about the central longitudinal axis of the axle. A torque tube is located in a fixed position about the axle and includes a torque tube foot extending radially inward from the torque tube to the axle for support by the axle. The torque tube foot is free of fixed connection with the axle. At least one stator disc is connected with the torque tube and one rotor disc is connected with the wheel for conjoint rotation therewith. An actuator is provided for axially moving the rotor and stator discs into frictional engagement with one another for braking the wheel. A brake housing is connected with the torque tube and the actuator is disposed within the brake housing. A clamp is located at one end of the axle for axially clamping the bearing, torque tube and axle. A vibration dampener operatively engages the torque tube and is arranged to dampen vibration in the torque tube and inhibit transmission of vibration to the axle.

In another aspect of the present invention, a brake assembly as described above is adapted for attachment to an axle and a wheel mounted on the axle by a bearing for rotation relative to the axle.

Other objects and features will be in part apparent and in part pointed out hereinafter.

BRIEF DESCRIPTION OF DRAWINGS

Corresponding reference characters indicate corresponding parts throughout the several views of the drawings.

DESCRIPTION OF THE PREFERRED EMBODIMENTS

Figure 1:
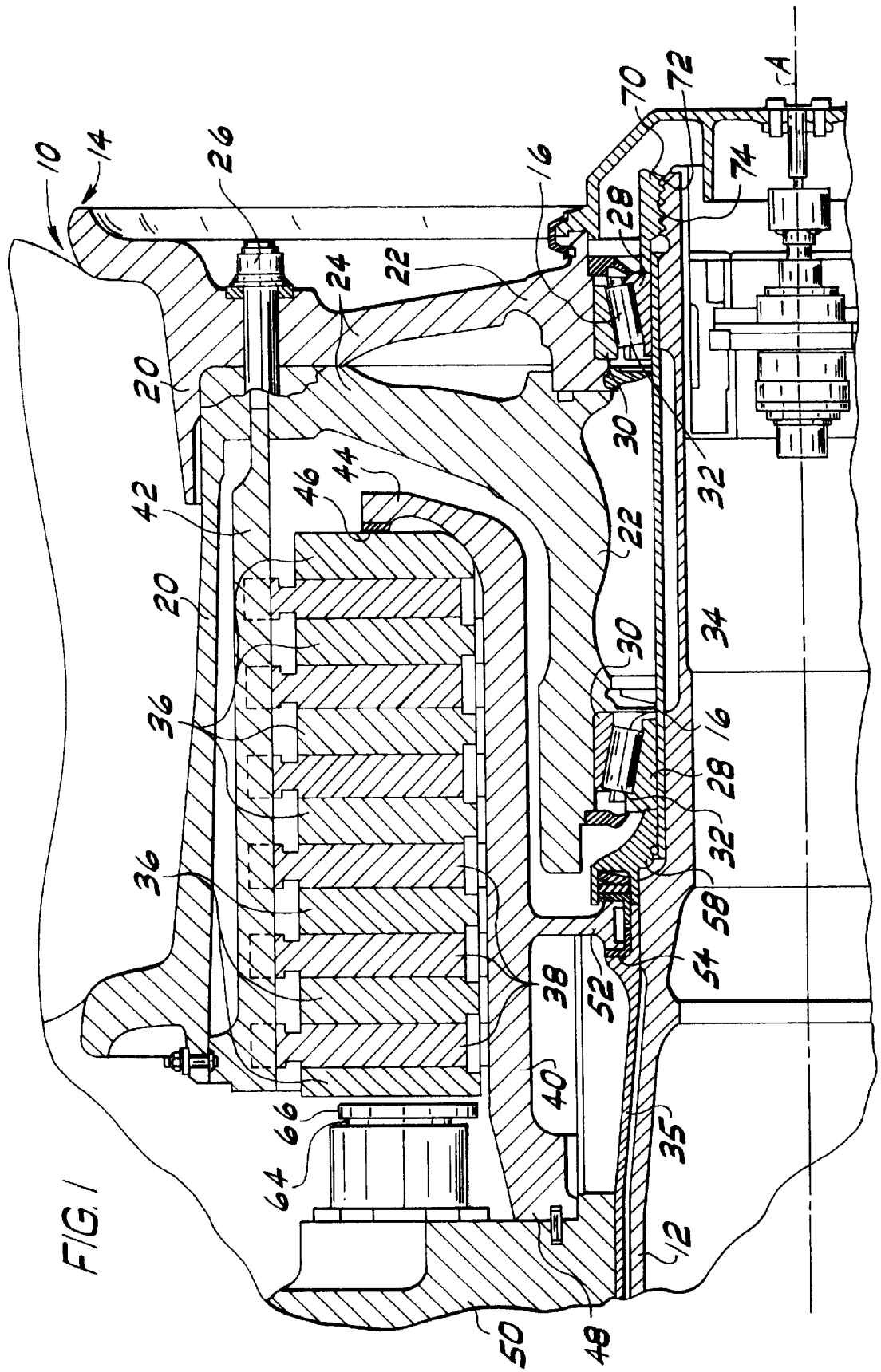
FIG. 1 is a fragmentary cross-sectional view of a wheel and brake assembly of the present invention.

Referring now to the drawings and first to FIG. 1, a wheel and brake assembly of the present invention is generally indicated at 10. The wheel and brake assembly 10 is for use in a vehicle such as an aircraft, but it is to be understood that the wheel and brake assembly may be used in other vehicles.

The wheel and brake assembly 10 is mounted on a central axle 12 of a landing gear of an aircraft such as an MD-11, for example. A wheel, generally indicated at 14, is rotatably mounted on the axle 12 by bearings 16 for rotation about a central longitudinal axis A of the axle. The wheel 14 includes two annular members each having a rim portion 20 for supporting a tire thereon and a hub portion 22 interconnected with the rim portion by a web 24. The wheel members are fastened together by suitable fastening devices such as bolts 26. The hub portions 22 are supported for rotation on two tapered roller bearings 16 which include an inner race 28 mounted in rotationally fixed relation to the axle 12, an outer race 30 fixed to the hub portion 22, and tapered rollers 32 secured between the inner and outer races. The inner race 28 of each bearing 16 is preferably mounted on an axle sleeve 34 which extends over the axle 12 in a rotationally fixed position. It is to be understood that the number and type of bearings 16 and configuration of the wheel 14, axle 12 and axle sleeve 34 may be different than shown without departing from the scope of this invention.

The brakes are preferably conventional multi-disc brakes comprising friction discs of carbon composite material or steel discs having wear resistant friction material on the outer surfaces, for example. As shown in FIG. 1, the brake comprises seven stator discs 36 and six rotor discs 38. The rotor discs 38 are axially slidably mounted on the wheel 14 and the stator discs 36 are axially slidably mounted on a torque tube 40 and interposed between the rotor discs. The rotor discs 38 are preferably attached by keys 42 (only one is shown) to the wheel 14 at circumferentially spaced locations around the wheel. The keys 42 support the rotor discs 38, which have internally slotted grooves for captive engagement by the key 42. The stator discs 36 are similarly attached to the torque tube 40 by a spline connection (not shown). It is to be understood that the number of discs 36, 38, material, configuration and arrangement of the discs may vary without departing from the scope of this invention.

Figure 2:
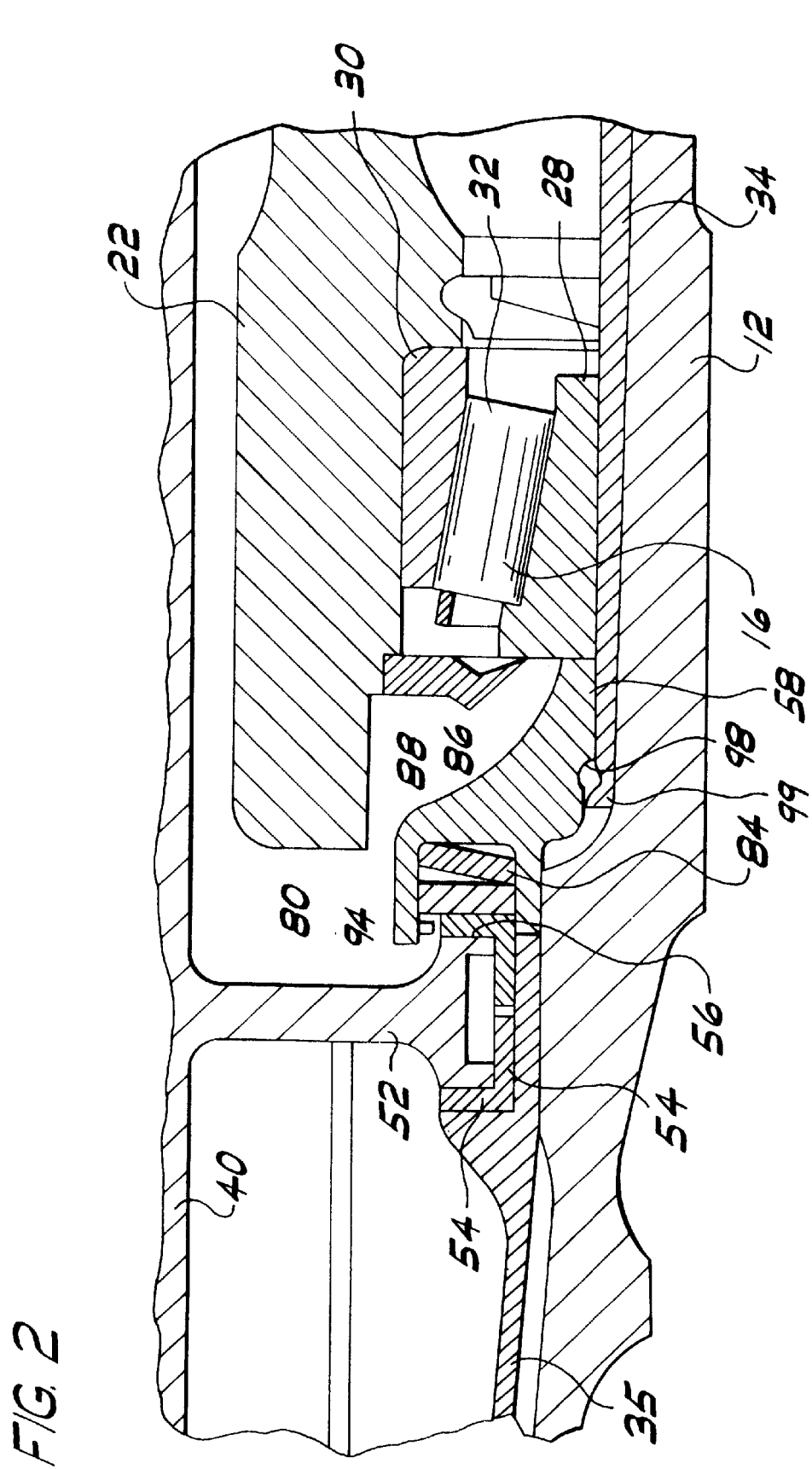
FIG. 2 is an enlarged fragmentary cross-sectional view of the wheel and brake assembly of FIG. 1.

The torque tube 40 locates and supports the stator discs 36 relative to the brake and removes braking torque during braking operations. An outwardly flaring end 44 of the torque tube 40 includes a reaction plate 46 for engagement with the axially outermost stator member 36 (right end of brake stack as viewed in FIG. 1). Another end 48 of the torque tube 40 is connected with a brake housing 50. The torque tube 40 is located in a fixed position about the axle and includes a torque tube foot 52 extending circumferentially around the axle 12 and radially inward from the torque tube to the axle for support by the outer diameter of the axle. As shown in FIG. 2, the free end of the torque tube foot 52 is generally U-shaped as viewed in transverse cross section. A pair of bushings 54 are interposed between the torque tube foot 52 and the axle 12 and positioned such that the foot 52 is received within the two bushings with sides 56 of the foot in contact with the bushings. The bushings 54 rest on a second axle sleeve 35 and a spacer 58 located between the torque tube foot 52 and the bearing 16.

Referring again to FIG. 1, the brake housing 50 includes a brake actuating mechanism comprising a plurality of circumferentially spaced hydraulic actuators having pistons 64 for selectively compressing the stator and rotor discs 36, 38 axially into frictional engagement with each other by applying a brake-actuating thrust to the axially innermost stator disc (left end of brake stack as viewed in FIG. 1) through pressure plates 66 connected to the pistons. During braking operations, braking torque is transferred from the stator disc 36 to the torque tube 40 through the reaction plate 46 at one end 44 of the torque tube, from the rotor discs 38 to the splined connection of the torque tube, and transmitted to the torque tube by the brake housing 50 connected to the opposite end 48 of the torque tube. The type and number of brake actuating mechanisms may vary without departing from the scope of the invention.

A clamp in the form of a nut 70 is located at one end of the axle 12 for axially aligning and clamping the bearings 16, torque tube 40, spacer 58, axle sleeve 35, and axle 12 to provide an axial force between these components. The nut 70 has internal threads 72 for mating with external threads 74 formed on the axle 12. The external threads 74 may also be formed on the axle sleeve 34. When the nut 70 is threaded onto the axle 12 and tightened, it abuts an inner race 28 of one of the tapered roller bearings 16 and applies an axial force which is transmitted to the other bearing through the wheel 14 to the outer race 30 of the inner bearing 16, which in turn applies an axial force to the spacer 58 interposed between the bearing and torque tube foot 52. The force applied to the torque tube foot 52 is resisted by the axle sleeve 35 mounted on the axle 12 and a vibration dampener, generally indicated at 80, located between the torque tube foot 52 and the spacer 58. Thus, the torque tube 40 is axially loaded and stiffened to inhibit vibrations in the torque tube and free play in the wheel and brake assembly. The clamp may have configurations other than the nut 70 without departing from the scope of the invention.

The vibration dampener 80 is located within the load path created by tightening of the axle nut 70 between the axle sleeve 35 and bearing 16 to clamp the torque tube foot 52 and the torque tube 40 to the axle 12 and dampen axial and radial vibrations in the torque tube caused by frictional engagement of the stator and rotor discs 36, 38 during braking action. Coulomb friction is created between the torque tube foot 52 and the axle 12 due to the stiffness of the vibration dampener 80 which forces the torque tube and axle sleeve 35 into contact with one another and helps to dissipate vibration energy and reduce vibration during braking operations. The vibration dampener 80 is capable of recovering its shape after deformation to provide a consistent clamping load to dissipate mechanical energy. The vibration dampener 80 is interposed between the axle 12 and the torque tube 40 to provide an elastic clamping path between the axle and torque tube which will substantially reduce vibrations induced in the rotatable portions of the brake during braking. The vibrational dampener 80 optimizes interface conditions between the brake and axle 12 by minimizing free play, maximizing energy dissipation through coulomb friction and allowing for thermal expansion of the brake on the axle 12.

As shown in FIG. 2, the vibration dampener 80 comprises a washer 84 having a curved radial surface such as a conical washer (commonly known as a Belleville spring) located within a cavity 86 formed in the spacer. A washer 88 having a generally flat radial surface is located between the Belleville spring 84 and the bushing 54. The inner end of the spacer includes a snap ring 94 for retaining the washer 88 and spring 84. The number, type, and arrangement of Belleville springs 84 and flat washers 88 may be other than shown without departing from the scope of this invention. The number of flat washers 88 may be increased or decreased, for example, to account for manufacturing tolerances or wear of mating surfaces over time. The springs 84 and washers 88 should be configured so that the spring force is sufficient to continuously create an axial load between the torque tube 40 and axle 12 to attenuate vibration from the torque tube 40 to the axle.

The spacer 58 includes a groove 98 on its inner surface for engagement with a rib 99 formed at one end of the axle sleeve 34 to limit the axial movement of the sleeve 34 away from the spacer 58. The length of the spacer 58 may be changed to accommodate different torque tube 40 and bearing 16 installations.

Figure 3:
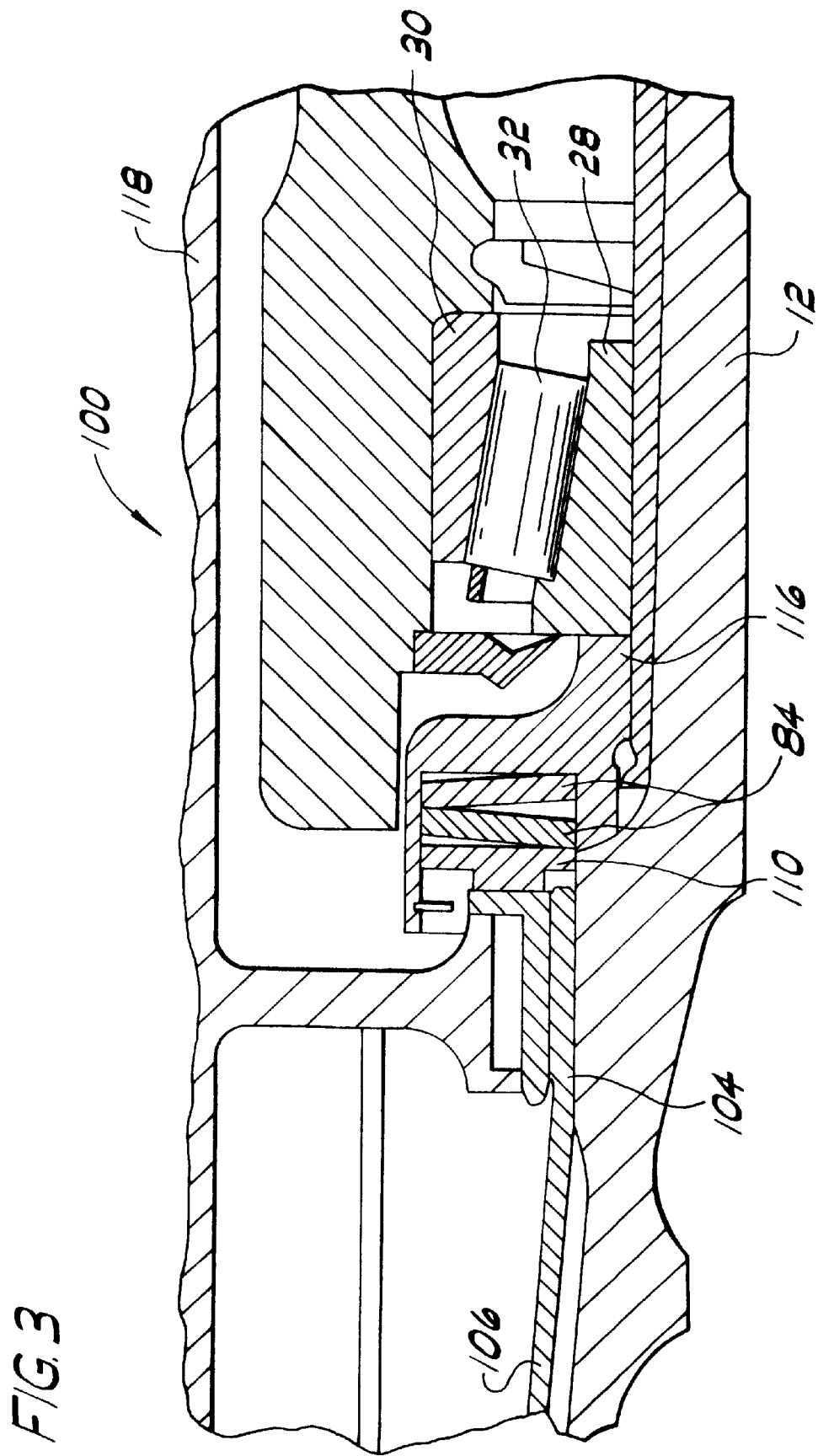
FIG. 3 is an enlarged fragmentary cross-sectional view of a second embodiment of a wheel and brake assembly of the present invention.

A second embodiment of the wheel and brake assembly is shown in FIG. 3 and generally indicated at 100. The arrangement of the wheel and brake is similar to the configuration described above except for the torque tube foot installation. The free end of a torque tube foot 102 has a generally L-shaped cross-section. A single L-shaped (flanged) bushing 104 is located between the torque tube foot 102 and axle sleeve 106 for supporting the foot. The vibration dampener includes two adjacent, generally coaxial Belleville springs 84 aligned with their outer edges adjacent one another, such that the springs operate in series. A ring 110 is provided between the springs 84 and bushing 104 to provide a preload on the springs. The thickness or number of rings 110 may vary to accommodate manufacturing tolerances. Flat washers may also be used. A snap ring 112 is provided at the end of a spacer 116 to retain the washers and ring in place during wheel and brake removal. The load path of this arrangement is from the Belleville springs 84, through the ring 110, the bushing 104, the torque tube foot 102, the torque tube 118, the brake housing 50 (as shown in FIG. 1) and the axle 12.

Figure 4:
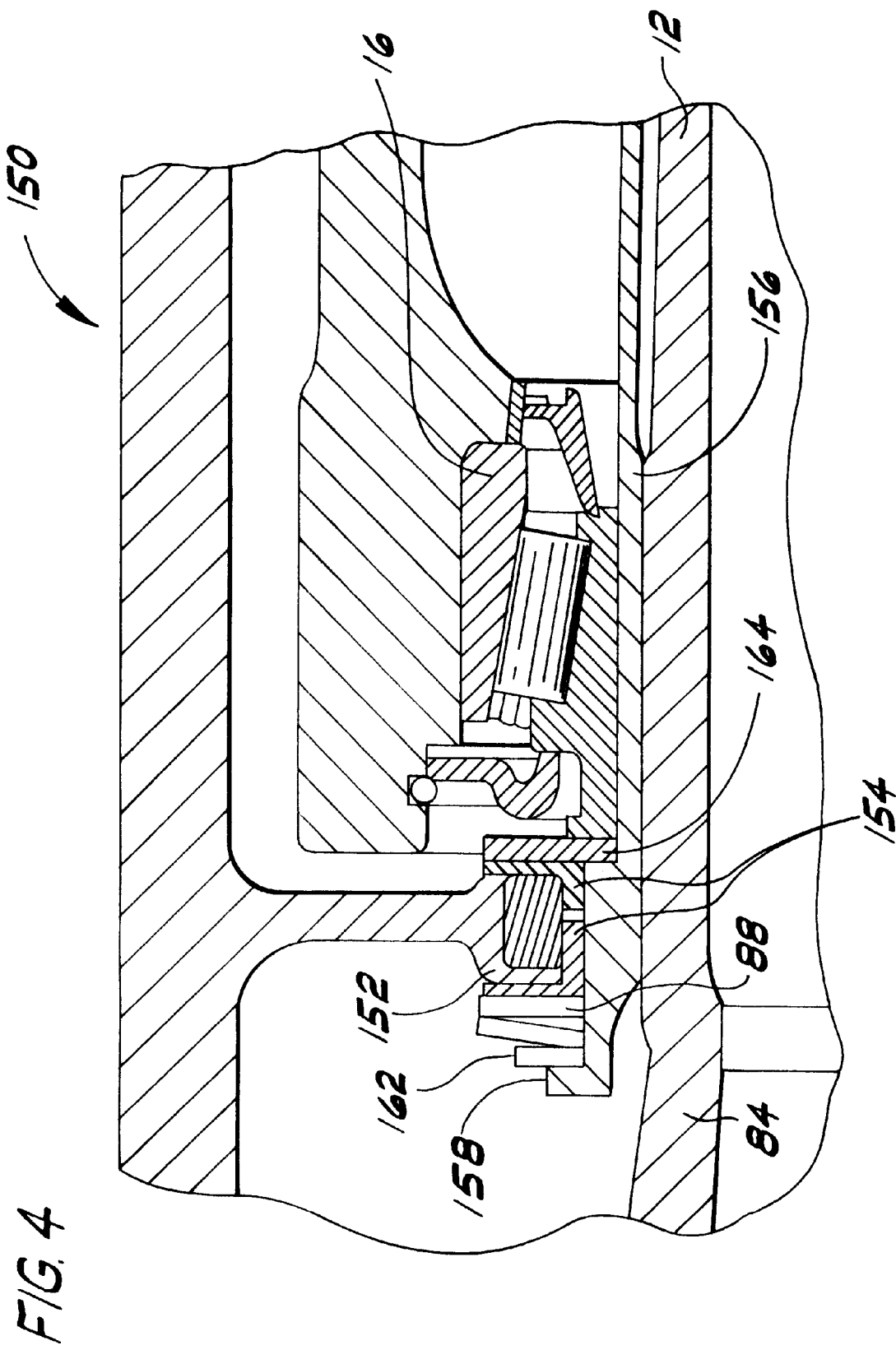
FIG. 4 is an enlarged fragmentary cross-sectional view of a wheel and brake assembly of a third embodiment of the present invention.

FIG. 4 shows a third embodiment of the wheel and brake assembly of the present invention, generally indicated at 150. A torque tube foot 152 is supported by a pair of bushings 154 which are supported by axle sleeve 156. A flat washer 164 is located between the bearing 16 and the bushing 154 in place of a spacer. A Belleville spring 84 and a flat washer 88 are located adjacent the bushing 154 on the side of the foot 152 opposite the bearing 16. A washer 162, mounted on the axle sleeve 156, is provided to maintain the spring 84 and washer 88 in proper alignment. A flange 158 on the axle sleeve 156 reacts against the load of the Belleville spring 84.

Figure 5:
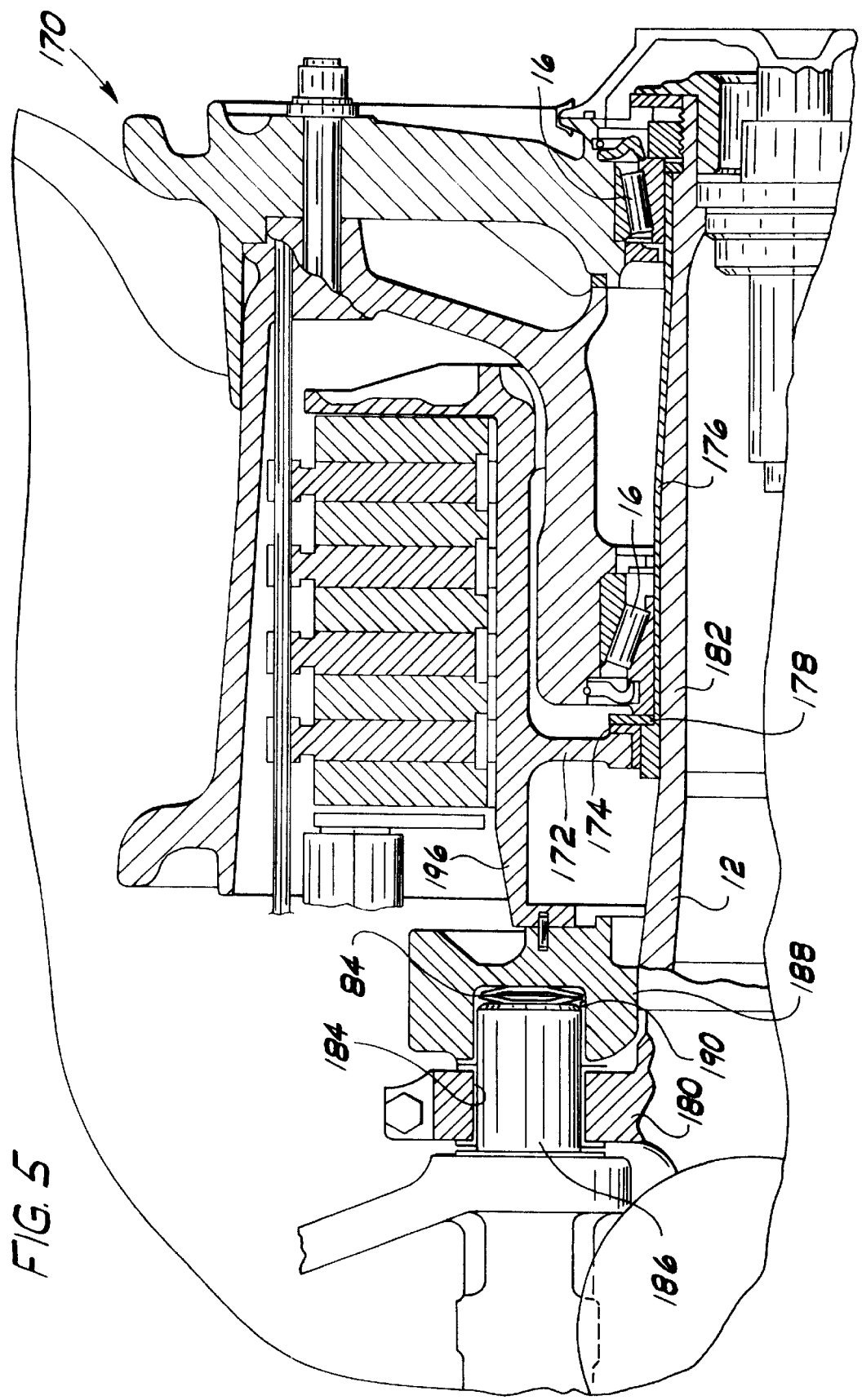
FIG. 5 is a fragmentary cross-sectional view of a fourth embodiment of a wheel and brake assembly of the present invention.

A fourth embodiment of the present invention is generally indicated at 170 and shown in FIG. 5. The wheel and brake assembly is for use on aircraft such as MD-80 and MD-90, for example, and is similar to the embodiments described above. A torque tube foot 172 is supported by a flanged bushing 174 located adjacent one of the roller bearings 16 and axle sleeve 176. A radial flange 180 extends from axle 182 and includes an opening 184 therein for receiving a pin 186 extending from the landing gear structure. The brake housing 188 includes a socket 190 for receiving the pin 186. A vibration dampener is located within the socket 190 of the brake housing 188 adjacent the end of the pin 186. The vibration dampener comprises a pair of adjacent, generally coaxial Belleville springs 84 arranged to operate in series and/or in parallel. The number and size of Belleville springs 84 may be increased or reduced depending on the loading required between the torque tube foot 172 and axle 182 to load the torque tube foot and dampen vibration. A flat washer or a spring guide (not shown) may also be located within the socket 190 to properly position the springs 84 in the socket. The brake housing 188 and torque tube 196 are maintained in controlled axial alignment by the Belleville springs 84 which loads the brake in a direction axially toward the bearing 16, through a flat washer 178.

It will be observed from the foregoing that the wheel and brake assemblies 10, 100, 150, 170 of the present invention provide an improved vibration dampening arrangement of the torque tube and axle. Importantly, the vibration dampener provides improved configuration stability whereby the torque tube will have increased stiffness, increased dampening and attenuate vibration during braking operations. The vibration dampener eliminates free play by constantly loading the torque tube against the axle. Furthermore, the vibration dampener is easy to install on existing brake installations with little or no modification and is economical to manufacture, easy to replace and improves the reliability of the brake and wheel assembly and landing gear by reducing structural damage due to vibration.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A wheel and brake assembly comprising:

an axle having a central longitudinal axis;

at least one bearing supported on the axle;

a wheel mounted on the axle by the bearing for rotation about the central longitudinal axis of the axle;

a torque tube located in a fixed position about the axle, the torque tube including a torque tube foot extending radially inward from the torque tube to the axle for support by the axle, the torque tube foot being free of fixed connection with the axle;

at least one stator disc connected with the torque tube and one rotor disc connected with the wheel for conjoint rotation therewith;

an actuator for axially moving said rotor and stator discs into frictional engagement with one another for braking the wheel;

a brake housing connected with the torque tube, the actuator disposed within the brake housing;

a clamp located at one end of the axle for axially clamping the bearing, torque tube, brake housing and axle; and a vibration dampener operatively engaging the torque tube foot and axle and being preloaded by the clamp and arranged to dampen vibration in the torque tube and inhibit transmission of vibration to the axle.

2. A wheel and brake assembly as set forth in claim 1 wherein the vibration dampener comprises a spring.

3. A wheel and brake assembly as set forth in claim 2 wherein said spring comprises at least one conical spring washer.

4. A wheel and brake assembly as set forth in claim 3 wherein the spring further comprises a washer having a generally flat radial surface adjacent the conical washer.

5. A wheel and brake assembly as set forth in claim 2 wherein the spring is located between the torque tube foot and bearing and the arrangement of the spring and torque tube foot is such that an axial force is applied to the torque tube and resisted by the bearing to restrict axial movement between the torque tube and the axle.

6. A wheel and brake assembly as set forth in claim 5 further comprising a spacer located between the bearing and torque tube foot.

7. A wheel and brake assembly as set forth in claim 6 wherein the spring is disposed between the spacer and the foot.

8. A wheel and brake assembly as set forth in claim 2 wherein the foot has a first side located generally adjacent to the bearing and a second side opposite the first side and wherein the spring is located adjacent the second side of the foot.

9. A wheel and brake assembly as set forth in claim 2 further comprising a radial flange extending from the axle and at least one pin connecting the radial flange to the brake housing.

10. A wheel and brake assembly as set forth in claim 1 wherein the clamp comprises a nut having threads for engagement with external threads located on one end of the axle.

11. A wheel and brake assembly as set forth in claim 1 further comprising another bearing mounting the wheel on the axle, the bearings each comprising a tapered roller bearing.

12. A wheel and brake assembly comprising:
an axle having a central longitudinal axis
at least one bearing supported on the axle;
a wheel mounted on the axle by the bearing for rotation about the central longitudinal axis of the axle;
a torque tube located in a fixed position about the axle, the torque tube including a torque tube foot extending radially inward from the torque tube to the axle for support by the axle, the torque tube foot being free of fixed connection with the axle;
at least one stator disc connected with the torque tube and one rotor disc connected with the wheel for conjoint rotation therewith;
an actuator for axially moving said rotor and stator discs into frictional engagement with one another for braking the wheel;
a brake housing connected with the torque tube, the actuator disposed within the brake housing;
a clamp located at one end of the axle for axially clamping the bearing, torque tube, brake housing and axle;
a vibration dampener operatively engaging the torque tube and arranged to dampen vibration in the torque tube and inhibit transmission of vibration to the axle;
wherein the vibration dampener comprises a spring;
a wheel and brake assembly further comprising a radial flange extending from the axle and at least one pin connecting the radial flange to the brake housing; and
wherein the brake housing includes a socket, and wherein the spring is located within the socket of the brake housing adjacent one end of the pin.

13. A wheel and brake assembly as set forth in claim 12 wherein the spring comprises a pair of conical spring washers, the washers being adjacent to each other generally coaxial with one another and arranged to operate in series.

14. A wheel and brake assembly as set forth in claim 12 further comprising a bushing interposed between the axle and the torque tube foot.

15. A brake assembly for attachment to an axle having a central longitudinal axis and a wheel mounted on the axle by at least one bearing for rotation relative to the axle, the brake assembly comprising:
a torque tube adapted for placement in a fixed position about the axle, the torque tube including a torque tube foot extending radially inward from the torque tube to the axle for support by the axle, the torque tube foot being free of fixed connection with the axle;
at least one stator disc connected with the torque tube and one rotor disc for connection with the wheel for conjoint rotation therewith;
an actuator for axially moving the rotor and stator discs into frictional engagement with one another for braking the wheel;
a brake housing connected with the torque tube, the actuator disposed within the brake housing;
a clamp adapted for placement at one end of the axle for clamping the bearing, torque tube, brake housing and axle; and
a vibration dampener operatively engaging the torque tube foot and axle and being preloaded by the clamp and arranged to dampen vibration in the torque tube and inhibit transmission of vibration to the axle.

16. A brake assembly as set forth in claim 15 wherein said vibration dampener comprises a spring.

17. A brake assembly as set forth in claim 16 wherein said spring comprises at least one conical spring washer.

18. A brake assembly as set forth in claim 17 wherein said spring further comprises a washer having a generally flat radial surface adjacent the conical washer.

19. A brake assembly as set forth in claim 15 wherein the clamp comprises a nut threadably engageable with external threads on the axle.

20. A brake assembly as set forth in claim 16 wherein the spring is located between the torque tube foot and bearing and the arrangement is such that an axial force is applied to the torque tube and resisted by the bearing to prevent axial movement between the torque tube and the axle.

21. A brake assembly as set forth in claim 16 wherein the foot has a first side located generally adjacent to the bearing and a second side opposite the first side and wherein the spring is located adjacent the second side of the foot.

22. A brake assembly for attachment to an axle having a central longitudinal axis and a wheel mounted on the axle by at least one bearing for rotation relative to the axle, the brake assembly comprising:
a torque tube adapted for placement in a fixed position about the axle, the torque tube including a torque tube foot extending radially inward from the torque tube to the axle for support by the axle, the torque tube foot being free of fixed connection with the axle;
at least one stator disc connected with the torque tube and one rotor disc for connection with the wheel for conjoint rotation therewith;
an actuator for axially moving the rotor and stator discs into frictional engagement with one another for braking the wheel;
a brake housing connected with the torque tube, the actuator disposed within the brake housing;
a clamp adapted for placement at one end of the axle for clamping the bearing, torque tube, brake housing and axle; and
a vibration dampener operatively engaging the torque tube and arranged to dampen vibration in the torque tube and inhibit transmission of vibration to the axle;
wherein said vibration dampener comprises a spring; and
a radial flange extending from the axle and at least one pin connecting the radial flange to the brake housing, the spring being interposed between the brake housing and the pin.

* * * * *